INVENTOR.
Robert K. Lockhart
BY [signature]
ATTORNEY

Dec. 17, 1957 R. K. LOCKHART 2,816,952

COLOR DEMODULATION

Filed Dec. 30, 1953 3 Sheets-Sheet 2

INVENTOR.
Robert K. Lockhart

BY [signature]

ATTORNEY

Dec. 17, 1957 R. K. LOCKHART 2,816,952
COLOR DEMODULATION
Filed Dec. 30, 1953 3 Sheets-Sheet 3
Fig_8
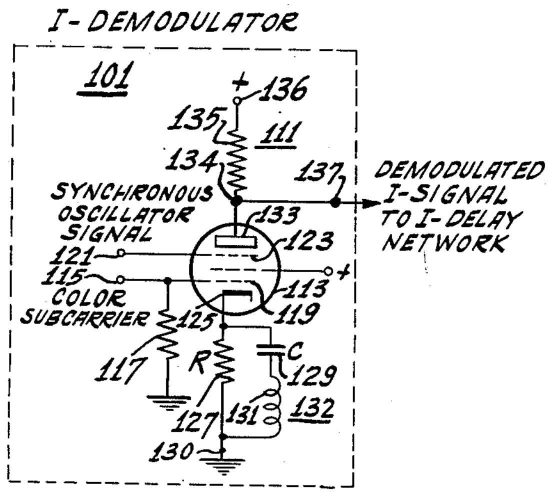
Fig_9
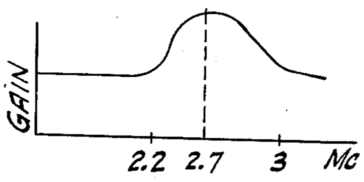
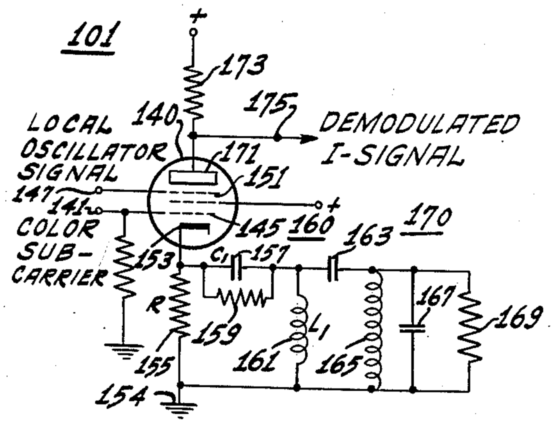
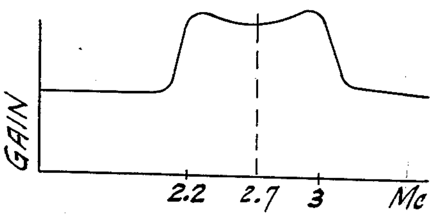
Fig_11
Fig_10
INVENTOR.
Robert K. Lockhart
BY [signature]
ATTORNEY United States Patent Office 2,816,952

Patented Dec. 17, 1957

2,816,952

COLOR DEMODULATION

Robert K. Lockhart, Moorestown, N. J., assignor to Radio Corporation of America, a corporation of Delaware Application December 30, 1953, Serial No. 401,316

13 Claims. (Cl. 178—5.4)

The present invention relates to demodulators, and more particularly to synchronous demodulators employed in color television receivers.

Color television is the reproduction on the viewing screen of a receiver of not only the relative luminescence or brightness, but also the color hues and saturations of the details in the original scene.

Complete coherence between the transmitter and receiver is essential in the successful operation of television equipment. As a result much emphasis is placed on the development and utilization of efficient transmission methods. This is particularly true in color television wherein not only is it necessary to transmit black-and-white information but also the chrominance information associated with the subject being televised.

The electrical transfer of images in color may be accomplished by additive methods. Additive methods produce natural color images by breaking down the light from an object into a predetermined number of selected primary or component colors. Color images may be transferred electrically by analyzing the light from an object into not only image elements as is accomplished by a normal scanning procedure but by also analyzing the light from elemental areas of object or images into selected primary or component colors and thereby deriving therefrom a signal representative of each of the selected component colors. A color image may be reproduced then at a remote point by appropriate reconstruction from a component color signal train.

In order to utilize the existing radio frequency spectrum most advantageously, there has been proposed a color television system which conforms to a set of standards known as the NTSC compatible television standards which are described at page 88 of "Electronics" for February 1952. In this system the transmission of a brightness signal is substantially the same as that conventionally employed for black and white television transmission. In addition, a color subcarrier wave, spaced from the main carrier wave by a frequency substantially equal to that of an odd multiple of one-half the line scanning frequency, is employed to carry the chromaticity information.

The monochrome and color signals occupy the same frequency band, that is, the band normally required for the transmission of monochrome pictures. This is possible because the spectrum of a television picture consists essentially of discrete frequencies with the energy concentrated near harmonics of line frequency (even harmonics of half line frequency). This spectrum results because television pictures are reproduced by a periodic scanning process; each picture contains a very high amount of redundancy and a spectrum can therefore be expressed approximately as a Fourier series. The spectrum of the signal consists also of such bunches of energy, and these are interleaved in the gaps of the monochrome spectrum at locations corresponding to odd harmonics of half-line frequency.

The monochrome signal voltage, $E_y$, can be obtained directly from a camera whose output is proportional to luminance. More usually it is made up by combining voltages ($E_r$, $E_g$, and $E_b$ related to the red, green, and blue reproducing primaries) which are derived from a three-color camera. In the latter case, the three components $E_r$, $E_g$, and $E_b$ are combined in proportion to their contribution to the total luminance.

The luminance signal is made up as follows:

$$E_y = 0.59E_g + 0.30E_r + 0.11E_b \qquad (1)$$

This expression indicates that the green, red, and blue reproducing primaries contribute respectively 59, 30 and 11 percent of the luminance of white (defined by the chromaticity coordinates $x=0.310$; $y=0.316$, that is, illuminant C). Note that the sum of the numerical factors in Eq. 1 is unity.

The system is so proportioned that white is produced when $E_r=E_g=E_b$. Hence for white light, substituting in Eq. 1.

$$E_y = E_r = E_g = E_b \qquad (1a)$$

It is evidently desirable that the coloring information disappear when there is no color. For this reason, this information is transmitted in terms of two components $(E_r-E_y)$ and $(E_b-E_y)$ which are called "color difference" signals. From Eq. 1a $(E_r-E_y)=0=(E_b-E_y)$ for white light (no color). Since the eye is insensitive to color in fine detail, these color-difference signals are usually, but not necessarily, limited in bandwidth to 1 or 2 mc.

Green, when present, is transmitted by these signals even though it does not appear explicitly. Green is, as Eq. 1 states, the main component of $E_y$. The color receiver recovers $(E_r-E_y)$ and $(E_b-E_y)$. The receiver can obtain $(E_g-E_y)$ by a mixture of $$-.051(E_r-E_y)$$

and the $-0.19(E_b-E_y)$, as shown as follows: Substituting Eq. 1 in $(E_r-E_y)$ and $(E_b-E_y)$ gives $$\begin{aligned}&-0.51(E_r-E_y)-0.19(E_b-E_y)=-0.51\\&(-0.59E_g+0.70E_r-0.11E_b)-0.19E_g-\\&0.30E_r+0.89E_b\\&=0.41E_g-0.30E_r-0.11E_b\\&=E_g-(0.59E_g+0.30E_r+0.11E_b)\\&=E_g-E_y\end{aligned} \qquad (2)$$

The color receiver adds the luminance signal to each color-difference signal as follows:

$$(E_r-E_y)+E_y=E_r \qquad (3a)$$

$$(E_b-E_y)+E_y=E_b \qquad (3b)$$

$$(E_g-E_y)+E_y=E_g \qquad (3c)$$

The voltages $E_r$, $E_g$ and $E_b$ are applied between the respective control grids and cathodes of a three-gun color picture tube. This may be done by applying $E_y$ to one electrode, and the color-difference signal to the other or by adding $E_y$ and the color difference signal in a signal adder circuit.

The foregoing discussion is over-simplified because the light output (L) of the picture tube is not directly proportional to the electrical input (E) but varies approximately as a power ($\gamma$) of this input as $$L = KE^{\gamma} \qquad (4)$$

The voltages applied to the picture tubes must therefore be predistorted by a process called gamma correction. One way in which this is done is by transmitting the following signals;

A. A monochrome signal made up of gamma-corrected primary voltages described as follows:

$$E_y' = 0.587E_g^{1/\gamma} + 0.299E_r^{1/\gamma} + 0.11E_b^{1/\gamma} \qquad (5)$$

B. The two "color-difference" components $$(E_r^{1/\gamma}-E_y')$$

and $$(E_r^{1/\gamma}-E_y')$$

In order to utilize certain well known properties of the human eye, it is convenient to develop what are known as I and Q signals where:

$$E_I' = -.274E_G^{1/\gamma} + .596E_r^{1/\gamma} - .322E_b^{1/\gamma} \quad (6)$$

$$E_Q' = -.522E_g^{1/\gamma} + .211E_r^{1/\gamma} + .311E_b^{1/\gamma} \quad (7)$$

The color difference signals may then be related to the I and Q signals by use of the following relationships $$\frac{E_g^{1/\gamma}-E_y'}{.703} = -.399E_I' - .900E_Q' \quad (8)$$

$$\frac{E_r^{1/\gamma}-E_y'}{1.141} = .839E_I' + .545E_Q' \quad (9)$$

$$\frac{E_b^{1/\gamma}-E_y'}{2.030} = .545E_I' + .839E_Q' \quad (10)$$

In the system of transmission of color television signals which conforms to the NTSC standards it is proposed that the Q color signals be limited in bandwidth to frequencies resulting in sideband frequencies in the double sideband region; this region extends from 0 to almost 600 kc. The I signal is so composed that it is double sideband up to 425 kc. and single sideband from this point up to almost 1.8 megacycles. Thus, no crosstalk appears between the two signals for frequencies exceeding the double sideband region since only one signal is transmitted in what is termed the single sideband region. This results in a two-color image reproduction for signal frequencies outside of the double sideband region, and a three-color image reproduction for signal frequencies within the double sideband region. This mode of transmission is described in detail in a copending U. S. patent application of David G. C. Luck, entitled "Color Television," Serial No. 223,021 filed on April 26, 1951. It has been found that limiting the bandwidth of one of the color signals in accordance with the teachings of the Luck patent application results in an improved color television system.

According to the Field Test Signal Specifications for color television transmission adopted by the National Television System Committee on February 2, 1953, which incorporate some of the principles taught by the aforementioned patent application of David G. C. Luck, it is contemplated that the color subcarrier wave be modulated by the two signals hitherto referred to as the "I" signal and the "Q" signal. Utilizing the aforementioned bandwidths, the "I" signal is utilized as the wideband color signal representing selected portions of three primary colors, which when taken in combination with the brightness signal provides color information along a two-color gamut between the color orange and the color cyan.

The selection of the orange-cyan gamut was made after exhaustive studies on the acuity of the human eye for resolving small area information. Since the eye is more sensitive to small area information along a gamut between orange and cyan than for other combinations of colors, these colors were chosen for a suitable two color signal.

For low signal frequencies in the region from 0 to 600 kc., the color information is transmitted by means of both sidebands, using the "Q" signal, which comprises selected portions of signals representing the three primary colors so as to provide three-color information when taken in combination with the brightness signal provides color information along the two-color gamut from the color green to the color purple. In such a system, narrow band signals representing color difference signals may be derived directly from the color subcarrier wave without reference to the "I" and "Q" signals. However, this information must necessarily be limited to the bandwidth of the "Q" signal since spurious information resulting from crosstalk occurs for signal frequencies in excess of the highest frequency transmitted in the double sideband region of the color subcarrier wave.

According to the Field Test Signal Specifications of the National Television System Committee, phases of the color subcarrier wave modulated by the "I" and "Q" signals bear a quadrature phase relationship one to the other. In addition, the proportions of the primary colors chosen to make up the "I" and "Q" signals are such that the phase of the component of the color subcarrier wave representing the red color difference signal lags the phase of the "I" signal component by 33°. In like manner, the phase of the component of the color subcarrier wave representing the blue color difference signal lags the phase of the "Q" signal component by 33°.

The most serious disadvantage of the more general uses of the two-phase modulation technique is the need for carrier reinsertion at the receiver. This characteristic makes the technique economically undesirable in many applications, but its use in compatible color television systems is entirely feasible because of the fact that time is available (during the blanking intervals necessarily provided in a television system) for the transmission of carrier-synchronizing information. Under the proposed NTSC signal specification, the subcarrier-synchronizing information consists of "bursts" of at least 8 cycles of the subcarrier frequency of 3.58 megacycles at a predetermined phase transmitted during the "back porch" interval following each horizontal synchronizing pulse. The "bursts" are separated from the rest of the signal at the receiver by appropriate time-gating circuits, and are used to control the receiver local oscillator through a phase detector and reactance tube.

The "I" and "Q" signals may be derived from such a color subcarrier wave by heterodyning the color subcarrier wave with locally generated waves having the same phase as those supplied to the "I" and "Q" modulators respectively at the transmitter. Thus, if a wave sin $\omega t$ is heterodyned with the color subcarrier wave, the modulation products will include a signal equal to the "Q" signal, and if a wave cos $\omega t$ is heterodyned with the color subcarrier wave the modulation products will include a signal *a* equal to the "I" signal.

Once the I and Q signals have been recovered they may be passed through appropriate filters and applied to inverters and matrix systems to recover the color information which is then combined with the luminance information to yield the appropriate color signals at the control grids of the tri-color kinescope. It is evident from the preceding description of the nature of the I and Q signals that since the Q signal is a double sideband signal and that the I signal is a double sideband signal at low frequency and a single sideband frequency at the higher band frequencies, special circuitry is necessary to insure the recovery of these signals so that color television reproduction can be achieved.

It is, therefore, the object of this invention to provide a means of simultaneous synchronous detection and sideband energy restoration.

It is another object of this invention to provide a means of demodulation wherein the demodulated signal is subjected to step amplification.

It is still another object of this invention to provide a simplified method of restoring sideband energy to the I signal in a color television receiver.

It is still another object of this invention to provide variable gain vs. frequency characteristics in a synchronous detector.

According to this invention the color demodulator in a color television receiver is peaked to compensate for amplitude loss due to loss of one sideband of the color subcarrier. This is accomplished by reducing the demodulator gain to half except for the color subcarrier spectrum region where the gain is peaked. The demodulator tube circuit uses a cathode resistor which is by-passed by a resonant LC circuit or some filter section having suitable frequency characteristics.

Other and incidental objects of this invention will become apparent upon a reading of the following specification and an inspection of the drawings in which:

Figure 8 shows the schematic diagram of a peaked I signal demodulator circuit;

Figure 9 shows the gain vs. frequency characteristic of the circuit in Figure 8;

Figure 10 shows a peaked I signal synchronous detector circuit utilizing a filter termination network; and Figure 11 shows the gain vs. frequency characteristic of the circuit in Figure 10.

The invention to be described is applicable to any system which employs the basic principles of synchronous detection whereby information is recovered from a subcarrier which has been modulated with respect to phase and amplitude. However, without departing from the broad spirit of the invention, it should be noted that the invention constitutes an important improvement in a method of synchronous detection of the I signal from the color subcarrier in a color television video signal; the I signal constitutes an unusual form of signal information as it contains double sideband energy from 0 to approximately 500 kc. and single sideband energy from this point to approximately 1.5 mc. In order for proper recovery of the color difference information contained by this signal it is necessary to subject this double and single sideband energy to circuitry which can accomplish the final demodulation in an efficient and accurate manner.

Figure 1:
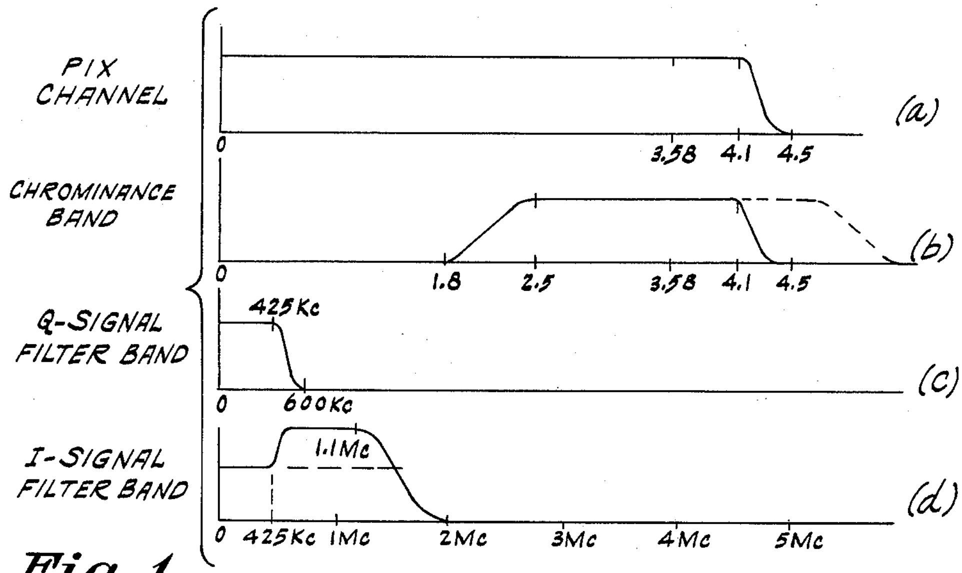
Figure 1 shows the spectrum bands for (*a*) a television picture channel, (*b*) the chrominance band, (*c*) the Q signal filter band and, (*d*) the I signal filter band.

In order to understand more fully the need for both such a signal and the invention which pertains to the demodulation of this signal, consider in more detail the nature of the signals which are used for color television transmission conforming to the set of standards known as the NTSC compatible television standards. Figure 1(*a*) shows the picture channel. Note that the spectrum is confined to a region less than 4½ megacycles wide and that the spectrum amplitudes sharply decrease beyond 4.1 megacycles. It has been mentioned that the color subcarrier frequency is 3.58 megacycles. This color subcarrier frequency is slightly more than a half megacycle removed from the upper end of the picture frequency spectrum. The picture frequency spectrum must necessarily be sharply attenuated before 4½ mc. so that sound information can be transmitted on a carrier which is centered at 4½ mc.

Consider Figure 1(*b*) now which shows what is called the chrominance filter band. The information must necessarily be centered about the color subcarrier frequency of 3.58 mc. If the frequencies involved for the color information are to be in the neighborhood of or slightly exceeding 1.5 mc., it is evident from the band shown in Figure 1(*b*) that the upper portion of the double sideband signal representing this color information will be in a higher frequency range than that permitted by the upper frequency range of the television picture spectrum. However, if color information representing harmonics of up to only ½ megacycle are required note that this information could easily be accommodated or transmitted in the permissible television spectrum range.

Therefore, the use of the I and Q signals may be instituted in such a way as to overcome the severe spectrum range difficulty. By utilizing a Q signal which involves harmonics less than 600 kc. in accordance to the filter band shown in Figure (*c*), then the television picture channel can easily accommodate double sideband information corresponding to the Q signal in the permitted spectral range. However when the higher harmonics constituting detail in the color information are to be utilized it is evident that whereas the lower sidebands flanking a 3.58 color subcarrier frequency can be easily accommodated in the permitted spectrum range, the upper sideband can only be accommodated up to around 4.1 mc. or barely more than 600 kc. beyond the color subcarrier frequency. Therefore it is evident that one method of sending out these very important higher frequency components of the I signal is to have the I signal contain double sideband information for harmonics up to ½ mc. and from that point on to contain only single sideband information describing harmonics which are valuable and worthy of inclusion in the spectrum for ranges up to 1½ mc.

The method of transmitting the I signal utilizing both the double sideband range and the single sideband range is an efficient method of utilizing the television spectrum permitted for commercial television. However, by sending out the single sideband information in what may be regarded as a primarily double sideband transmission system, it is evident that the spectrum energy corresponding to the single sideband region is only ½ of what it would be transmitted were the signal to be double sideband for all color frequency harmonics. Therefore, once detection of the I signal has been accomplished, or as in the case of the present invention, during the synchronous detection of the I signal, it is necessary to compensate for the signal amplitude loss due to the loss of the sideband. If some phase correction should become necessary, it can be accomplished in succeeding stages by use of appropriate equalization networks.

Figure 2:
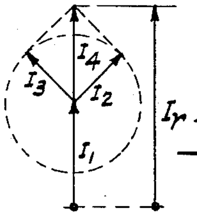
Figure 2 shows a carrier vector which is subjected to double sideband amplitude modulation.
Figure 3:
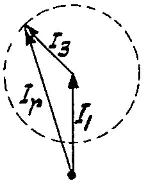
Figure 3 shows a carrier vector which is subjected to single sideband amplitude modulation.

The effect of eliminating a sideband is graphically illustrated by the vector diagram shown in Figures 2 and 3. In Figure 2 the carrier $I_1$ is acted upon by an upper sideband $I_2$ and a lower sideband $I_3$ which revolve in opposite directions with respect to each other, and if the frame of reference is presumed to be revolved at carrier angular frequency, these sideband vectors may be assumed to be rotating as shown from the tip of the carrier vector. The net result of the action of these sidebands is to produce a sideband resonant vector which either adds to or subtracts from the amplitude of the carrier vector thereby producing the resultant vector $I_r$. When $I_3$ and $I_2$ have reached a position to give a maximum value of their resultant vector $I_4$ the result is that $I_1$ is increased by $I_4$ which has a maximum possible amplitude equal to twice the amplitude of either of the component sideband vectors.

Figure 3 shows the case when the sideband vector $I_2$ is eliminated. It is evident here that at no time can the total amplitude be greater than the sum of $I_1$ and $I_3$ and that phase distortion is inherent in this system. However, had the system containing the sideband vector $I_3$ and the carrier vector $I_1$ been passed through a network which increased the sideband $I_3$ to twice the value, it is evident that the amplitude characteristics of the double sideband transmission would have been regained.

Figure 4:
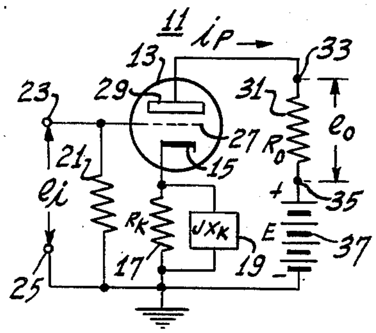
Figure 4 shows an amplifier which uses degeneration in its cathode circuit.

Before proceeding with the general principles of synchronous detection and the use of a peaking network in a synchronous detector to properly treat an I signal, consider the simple circuit 11 shown in Figure 4. It has an input signal $e_1$ applied to the input terminal 23 which applies this signal on the grid 27. In the cathode circuit of this tube is the resistor 17 which is shunted by the reactance 19. The plate 29 is connected to the output load 31 which is then connected to the battery 37 which applies the proper positive potential to the plate and furnishes the plate current $i_p$.

When an electrical impedance network is inserted into the cathode circuit, the plate-current signal passing through the cathode impedance network applies a signal to the grid circuit in reverse phase to the input signal and thereby reduces the amplification to an extent dependent upon the frequency of the applied signal and the impedance presented by the impedance network at this frequency.

Consider the case when only a cathode resistance $R_k$ is present; the input signal is reduced by the signal developed across $R_k$ and the total output voltage generated by the tube is $$e = \mu e_i - \mu i_p R_k \qquad (11)$$

where $\mu$ is the amplification factor of the tube. The total plate resistance in the plate circuit has become $r_p + R_0 + R_k$; therefore the plate current is $$i_p = \frac{\mu(e_i - i_p R_k)}{r_p + R_0 + R_k} \qquad (12)$$

If the output signal $e_0$ is $i_p R_0$, then the gain of the tube is $$\frac{e_0}{e_i} = \frac{\mu R_0}{r_p + R_0 + R_k(1+\mu)} \qquad (13)$$

If the effect of shunting the resistor $R_k$ with the reactance $jX_k$ is taken into consideration, the gain becomes $$\frac{e_0}{e_i} = \frac{\mu R_0}{R_0 + r_p + j\frac{(1+\mu)R_k X_k}{R_k + jX_k}} \qquad (14)$$

Consider the behavior of the gain of the amplifier 11 as a result of the shunting of the cathode resistor 17 by the reactance network 19. Should the reactance network serve in any way to decrease the effective resistance presented in the cathode circuit, the gain of the system will increase. Should the effect of this shunting reactance be to increase the resistance in the cathode circuit, however, the gain will decrease. Therefore since the reactance will be a function of frequency it is evident that by proper choice of the type of reactance used, the gain of this amplifier may be made to vary with frequency in any manner desired; whatever phase changes may be induced because of the action of this reactance may be compensated for if necessary, by compensating or equalizing networks.

Figure 5:
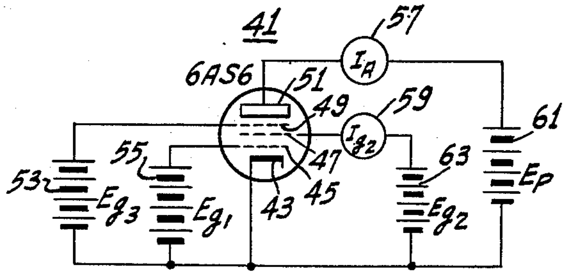
Figure 5 shows the specific circuit of a triple-grid amplifier tube suitable for suppressor grid and control grid control.
Figures 6, 7:
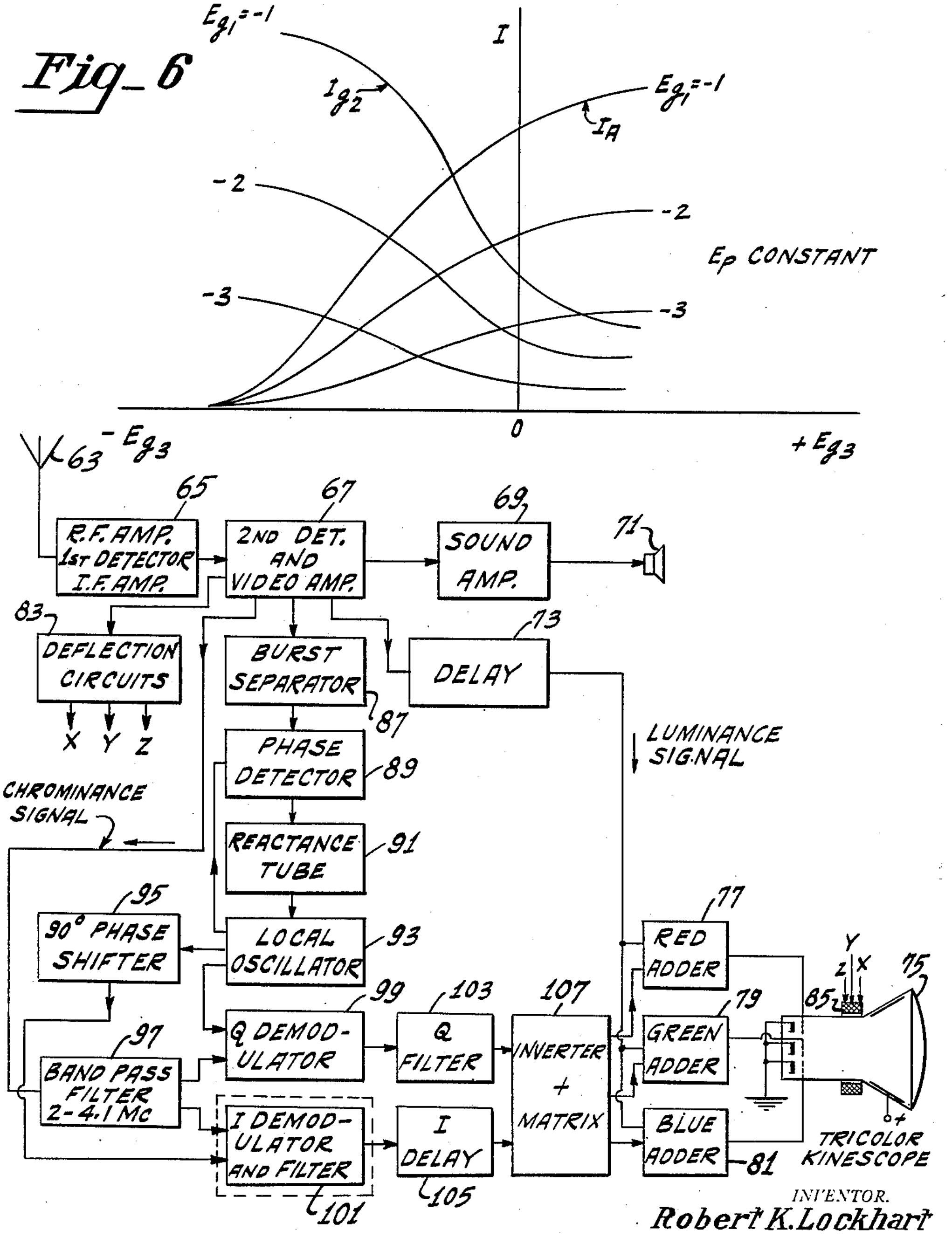
Figure 6 shows the characteristic curves of a 6AS6 triple-grid amplifier tube.
Figure 7 shows the block diagram of a color television receiver.

Having discussed the general effect of cathode degeneration in an amplifier tube circuit, consider next the performance of a triple-grid tube such as a 6AS6 whose basic circuit is shown in Figure 5 and whose characteristic curves are shown in Figure 6. What is desired is that this tube function as a synchronous detector. Note that the use of either the space charge control grid 45 or the suppressor grid 49 may be used to control the current reaching the anode. It is also evident that whereas the space charge control grid 45 controls all current passing through the tube the suppressor grid 49 also has the effect of controlling the distribution of current between the anode 51 and the screen grid 47. Basically the action within this tube can be described as follows. The number of electrons leaving the cathode 43 is roughly proportional to any signal voltage on the space charge control grid 45 assuming a range of reasonable linearity, since the screen grid 47 prevents the suppressor grid 49 and the plate 51 from exercizing any significant influence on the space current. The proportion of the emitted electrons that reach the plate instead of the screen is roughly proportional to the relative voltage on the suppressor grid 49. If the suppressor grid 49 is positive, the screen grid 47 collects only a few electrons and most of them are attracted to the plate 51 which is of higher potential. If the suppressor grid 49 is highly negative, however, it may make a potential barrier so great that no electrons can pass through to the plate 51 and all of the electrons are therefore returned to the screen grid 47. The plate current contains a component which is proportional to the signal on the space charge control grid 45 and the suppressor grid 49. The use of this tube as a synchronous detector, like most simple modulators, produces an output consisting of three components, a signal derived from the signal on the space charge control grid, a signal derived from any signal put on the suppressor grid, and the modulation products due to the interaction of these two signals. The relative amplitudes of the three components will depend on the tube type, the relative input levels, and the bias conditions.

The operation of a suppressor grid type modulator as a synchronous detector is accomplished by placing one signal on the space charge control grid and the other signal on the suppressor grid, and the detection demodulation is essentially a process whereby signals may be moved to new positions in the frequency spectrum. This action is illustrated by the following simple development.

Let A and B represent two signals that vary independently with time and let $\omega_c/2\pi$ represent the carrier frequency. Since doubly-balanced modulators produce a true product signal, the transmitted signals may be written as $$A \cos \omega_c t + B \cos (\omega_c t + 90°) \qquad (15)$$

To recover the A component, the entire transmitted signal is first multiplied by cos $\omega_c t$ in a modulator to produce $$\begin{aligned} &A \cos^2 \omega_c t + B \cos(\omega_c t + 90°) \cos \omega_c t \\ &= \tfrac{1}{2}A + \tfrac{1}{2}A \cos 2\omega_c t + \tfrac{1}{2}B \cos 90° \\ &+ \tfrac{1}{2}B \cos(2\omega_c t + 90°) \end{aligned} \qquad (16)$$

When this output is filtered to remove the second harmonic components, the remaining signal is simply ½A (since cos 90°=0). The factor of ½ results from the fact that one-half of the signal energy is lost in the second-harmonic component in the process of detection, but this factor may be readily absorbed in the gain adjustment of the system.

Likewise, the output of a modulator which multiplies the transmitted signal by cos $(\omega_c t + 90°)$ is $$\begin{aligned} &A \cos \omega_c t \cos(\omega_c t + 90°) + B \cos^2(\omega_c t + 90°) \\ &= \tfrac{1}{2}A \cos 90° + \tfrac{1}{2}A \cos(2\omega_c t + 90°) \\ &+ \tfrac{1}{2}B + \tfrac{1}{2}B \cos(2\omega_c t + 180°) \end{aligned} \qquad (17)$$

and when the second-harmonic components are removed, the remaining signal is ½B.

Note in Equation 17 the term $\tfrac{1}{2}B$ which represents the amplitude of the demodulated signal. Actually the true magnitude of this signal will be dependent upon the nature of the synchronous detector used and whatever gain or loss of amplitude is inherent in the system. Note too that this amplitude will also be a function of frequency, should frequency dependent elements be integral parts of the synchronous detector system. Should a synchronous detector tube of the type described with reference to Figure 5 and a cathode degeneration method of the type described with reference to Figure 4, be combined, then the harmonic components inherent in the signal being demodulated may be subjected to a gain vs. frequency curve which is a function of the precise nature of the degeneration network in the cathode circuit.

Turning now in more detail to the precise application of the I signal demodulator and synchronous detector in the color television receiver, consider first the overall color television circuit shown in Figure 7. Here the transmitted color signal reaches the antenna 63 from which point it is applied to the R. F. amplifier, the first detector, and the intermediate frequency amplifier—all blocked together as 65. The signal then enters the second detector and video amplifier 67 in which part of the receiver, the color television video signal is recovered from the transmitted signal.

There are numerous methods of recovering the sound information from the transmitted television signal. One is to use a sound trap in the intermediate amplifier section; however the most commonly used at the present day is the one based on the well known principle of intercarrier sound whereby the sound signal is recovered in the video amplifier 67. Once the audio signal is recovered it is then sent through the sound amplifier 69 and applied to the loud speaker 71.

There are four branches which utilize the detected video signal as obtained from the second detector and the video amplifier 67. One circuit branch directs the complete signal toward the color kinescope 75 where it is used to control luminance by being applied to all kinescope guns in equal proportions; the luminance signal is actually sent through the delay network 73 and then impressed on the red adder 77, the green adder 79, and the blue adder 81 within which circuits the luminance signal is also combined with the color difference information. Also in a second branch, the video signal is applied to the deflection circuits 83 in which circuits the synchronizing information is separated, utilized to operate the deflection circuits and then applied to the yokes of the kinescope 75. A third branch utilizes the synchronizing information which is necessary for proper phasing of the I and Q signals within the color television receiver. The complete video signal is applied to the burst separator 87 which separates the burst signal following the horizontal synchronizing pulse and applies this separated burst signal to the phase detector 89. At the same time a local oscillator 93 generates a signal having the same frequency as a color subcarrier. The output of this local oscillator is sent in part to the phase detector 89 where it is compared to the incoming signal from the burst separator. Should these signals not be in proper phase, the phase detector presents a correcting signal to the reactance tube circuit 91 which returns the local oscillator output to a phase determined by that of the synchronizing burst.

The fourth branch from the second detector and video amplifier 67 deals with the chrominance signal which is that signal associated with the color subcarrier. This chrominance signal is passed through the band pass filter 97 which removes all components outside of the band from 2 to 4.1 mc. This filtered chrominance signal is then simultaneously applied to the Q demodulator 99 and the I demodulator and filter 101. In order that synchronous detection of the I and Q signals can be accomplished, a local oscillator signal is impressed into the Q demodulator 99 and also into the I demodulator 101 using a 90° phase shifter 95 to recreate the quadrature conditions necessary for the separation of the two signals. Once the Q demodulator has yielded the Q signal, this Q signal is passed through the Q filter 103. In like fashion the I demodulator yields the I signal which is also filtered in the demodulator and passes it through the delay circuit 105. The I and Q signals are impressed into the inverter and matrix network 107 from which the component color difference signals corresponding to red, green, and blue issue to the adders 77, 79 and 81 which combine the correct amount of red, green, and blue color difference signals with the luminance signal, the resulting color signals being impressed on the grids of the tri-color kinescope 75.

Consider now in detail the invention performing the functions of the combined I demodulator and filter circuit 101 shown in Figure 7; a basic circuit is shown in Figure 8. Here a triple-grid amplifier tube 113 is shown wherein a color subcarrier is applied to the terminal 115 which impresses this signal on the control grid 119. The screen grid has an appropriate potential which may be either derived from a battery or a power supply. The output of the local oscillator 93, appropriately phased, is then applied to the terminal 121 which applies this signal to the suppressor grid 123. The plate circuit of tube 113 consists of anode 133 which has a load resistor 135 with a potential applied to the terminal 136. The output of the tube is obtained directly at the anode connection 134. In the cathode circuit connecting the cathode 125 to the ground connection 130 there is placed in shunt a cathode resistor 127 and a series resonant network 132 composed of a condenser 129 and an inductance 131. This series resonant network is so designed that it has a resonant frequency at approximately 2.7 mc.

The action of the series resonant circuit 132 is to produce anti-degeneration in the cathode circuit in the vicinity of its resonant frequency. Therefore at very low frequencies the series resonant circuit 132 will have negligible effect on the gain of the amplifier tube 113 and the bias and gain will be determined principally by the cathode resistor 127. However, as the frequency is increased, the series resonant circuit 132 will eventually short circuit of the cathode resistor 127 at its resonant frequency of 2.7 mc. which is near the center of the single sideband region which extends from approximately 2.2 megacycles to almost 3.1 megacycles and by proper choice of the resistor 127 a gain characteristic such as that shown in Figure 9 can be obtained which peaks the gain in the region of the single sideband frequencies so that the sideband amplitudes in the single sideband region are increased during synchronous detection without necessitating additional circuits.

In Figure 10 a circuit is shown which involves a cathode anti-degeneration network of more elaborate structure which produces more than merely a peaking action of the demodulated wave. The gain vs. frequency curve for this circuit, as shown in Figure 11 is now the step curve which is necessary to more efficiently utilize the single sideband components of the I signal. This is accomplished by using a triple-grid amplifier tube 140 with the color subcarrier applied to the input terminal 141 to the control grid 145 and the local oscillator signal applied to the suppressor grid 151 by way of the input terminal 147. In the cathode circuit connecting the cathode 153 to the ground connection 154, is the cathode resistor 155 and in shunt with this cathode resistor 155 a filter network made up of the high pass filter system 160 and the resonant circuit 170 which terminates the high pass filter 160. The constants of the high pass filter 160 and the terminating resonant circuit 170 are then chosen to give the step function gain characteristics shown in Figure 11. Although the circuit utilizing the high pass filter network 160 and the terminating network 170 will perform the peaking function efficiently, it is evident that any of many filter circuits available will provide the required step function characteristic similar to that shown in Figure 11 can be used.

While the specific embodiments of the invention as contained in Figures 8 and 10 have shown triple-grid amplifier tubes and cathode anti-degeneration networks which have shown considerable utility for the practical application of the invention, it is possible in accordance with other forms of the invention to use other connections and other modifications of the circuit. For example, the local oscillator wave can be applied to the control grid terminal 115 of the tube 113 and the color subcarrier can be applied to the suppressor grid terminal 121 without detracting from the performance of the system and as has been stated, a anti-degeneration network having suitable impedance characteristics for restoring the sideband amplitudes in the single sideband region can be used in the cathode circuits in shunt with the cathode resistors 127 or 155; it is also possible to connect a degeneration network of suitable frequency characteristics in series with the cathode resistor or a network which is the sole connection from cathode to ground.

Having described the invention, what is claimed is:

1. A radio signalling circuit suitable for use as a synchronous detector of a signal wave represented by the phase and amplitude of an incoming carrier wave, said signal wave represented by double sideband energy for a lower band of frequencies and single sideband energy for a band of frequencies greater than that utilized for said double sideband, said signalling circuit comprising in combination, a local oscillator having a frequency equal to that of said incoming carrier wave, a synchronous detector circuit, said oscillator operatively connected to said detector circuit, an admittance network having an adjustable admittance vs. frequency characteristic, means for utilizing said admittance network as a degeneration element in said synchronous detector circuit to vary the gain of said synchronous circuit as a function of frequency to restore said single sideband energy to a level having a prescribed relationship with that of said double sideband region energy.

2. A synchronous detector circuit comprising in combination, a first signal source of fixed frequency and phase, a second signal source yielding a phase modulated signal of identical frequency to that coming from said first signal source but with phase and amplitude variations constituting signals to be detected, the relative amplitudes of component harmonics of said phase modulated signal varying as a function of modulating frequency according to a first prescribed curve, an electron control device having a fixed potential connection, a cathode, an anode, an anode output circuit, a plurality of control grids, means for causing said electron control device to yield a heterodyning action into said anode output circuit when said first signal source is applied to one of said plurality of control grids and said second signal source is coupled to another of said plurality of control grids, a two terminal impedance network whose absolute impedance curve is the inverse curve of said first prescribed curve, and means for connecting said two terminal impedance network between said cathode and said ground.

3. A suppressed carrier synchronous detector system comprising in combination, a suppressed carrier wave source having a double sideband array for said first sideband group flanking a position of absolute carrier and a single sideband group on one side of position of said absolute carrier but of such frequency range as to be separate from the side frequencies corresponding to said double sideband group, a synchronous detector circuit having an impedance network in its cathode circuit suitable for providing frequency vs. gain characteristics of said synchronous detector for detecting the components represented by single sideband components to yield amplitude values commensurate with those achieved by detected components from said double sideband region, and means for coupling said local oscillator source and said suppressed sideband source to said synchronous detector circuit.

4. A color television receiver system utilizing quadrature modulation techniques and including a source of a color subcarrier signal containing in part sideband information pertaining to a color difference signal wherein said sideband information is double sideband over a lower frequency color difference signal range and single sideband for color difference signal frequencies from substantially near the highest frequency of said lower frequency range up to a maximum frequency, said single sideband frequency range constituting a loss in component energy as compared to said double sideband range, comprising in combination, a local oscillator yielding a signal of phase and frequency suitable for inclusion in process of synchronous detection of said color difference signal, a multigrid electron tube, said multigrid electron tube having an anode, an anode output circuit, a cathode, a connection of fixed potential, a control grid, a screen grid and a suppressor grid, a cathode resistor, means for connecting said cathode resistor between said cathode and said connection of fixed potential, an admittance network, coupling means for connecting said admittance network in shunt with said cathode resistor, said admittance network having an admittance vs. frequency curve of shape substantially that necessary to produce degeneration of said multigrid electron tube to restore sideband energy to color difference components corresponding to single sideband range, means for connecting said color subcarrier signal to said control grid, means for connecting said local oscillator to said suppressor grid, biasing means suitable for said multigrid electron tube to function as a synchronous detector with a gain subject to degeneration as a function of frequency in accordance with action of said admittance network.

5. A color television receiver system utilizing quadrature modulation techniques and including a source of a color subcarrier signal containing in part sideband information pertaining to a color difference signal wherein said sideband information is double sideband over a lower frequency color difference signal range and single sideband for color difference signal frequencies from substantially near the highest frequency of said lower frequency range up to a maximum frequency, said single sideband frequency range constituting a loss in component energy as compared to said double sideband range, the combination of, a local oscillator for developing a signal of phase and frequency suitable for inclusion in process of synchronous detection of said color difference signal, a multigrid electron tube circuit having an anode, an anode output circuit, a cathode, a connection of fixed potential, a control grid, a screen grid and a suppressor grid, a cathode resistor, means for connecting said cathode resistor between said cathode and said connection of fixed potential, an admittance network, coupling means for connecting said admittance network in shunt with said cathode resistor, said admittance network having an admittance vs. frequency curve of shape substantially that necessary to adjusting detection gain of said multigrid electron tube in said double sideband range of frequencies to substantiate one half of the detection gain in said single sideband range of frequencies, means for connecting said color subcarrier signal to said control grid, means for connecting said local oscillator to said suppressor grid, biasing means suitable for said multigrid electron tube to function as a synchronous detector with a gain subject to degeneration as a function of frequency in accordance with action of said admittance network.

6. A color television receiver system utilizing quadrature modulation techniques and including a source of a color subcarrier signal containing in part sideband information pertaining to a color difference signal wherein said sideband information is double sideband over a lower frequency color difference signal range and single sideband for color difference signal frequencies from substantially near the highest frequency of said lower frequency range up to a maximum frequency, the combination of, a local oscillator for developing a signal of phase and frequency suitable for including in process of synchronous detection of said color difference signal, a multigrid electron tube circuit having an anode, an anode output circuit, a cathode, a fixed potential terminal, a control grid, a screen grid and a suppressor grid, a cathode resistor, means for connecting said cathode resistor between said cathode and said fixed potential terminal, an admittance network, coupling means for connecting said admittance network in shunt with said cathode resistor, said admittance network having an admittance vs. frequency curve of shape substantially that necessary to restore a prescribed level of sideband energy to color difference signal components corresponding to single sideband range, means for coupling said color subcarrier signal to said suppressor grid, means for coupling said local oscillator signal to said control grid, biasing and potential means suitable for causing said multigrid electron control tube to operate such that it functions as a synchronous detector with a gain vs. frequency characteristic of said detected signal dependent upon an admittance vs. frequency curve of said admittance network.

7. A color television receiver system utilizing quadrature modulation techniques and including a source of a color subcarrier signal containing in part sideband information pertaining to a color difference signal wherein said sideband information is double sideband over a lower frequency color difference signal range and single sideband for color difference signal frequencies from substantially near the highest frequency of said lower frequency range up to a maximum frequency, the combination of, a local oscillator yielding a signal of phase and frequency suitable for including in process of synchronous detection of said color difference signal, a multigrid electron tube circuit having an anode, an anode output circuit, a cathode, a fixed potential terminal, a control grid, a screen grid and a suppressor grid, a cathode resistor, means for connecting said cathode resistor between said cathode and said fixed potential terminal, a series resonant circuit coupling means for connecting said series resonant circuit in shunt with said cathode resistor, said series resonant circuit having an admittance vs. frequency curve of shape substantially that necessary to control the detection gain of said multigrid electron tube in said double sideband range of frequencies to one half of detection gain in said single sideband range of frequencies, means for coupling said color subcarrier signal to said suppressor grid, means for coupling said local oscillator signal to said control grid, biasing and potential means suitable for causing said multigrid electron control tube to operationally function as a synchronous detector with a gain vs. frequency characteristic of said detected signal dependent upon an admittance vs. frequency curve of said series resonant circuit.

8. In a color television receiver, the combination of, a source of a chrominance signal including modulations representing a color difference signal having a prescribed phase and including modulating frequencies corresponding to a first and a second frequency range, a source of demodulating signals having said prescribed phase, a demodulator device coupled to said chrominance signal source and to said demodulating signal source and having at least an output circuit and a demodulation amplitude level control electrode, demodulation amplitude level control means coupled to said demodulating amplitude level control electrode for providing demodulation of said first frequency range of said color difference signal into said output circuit at a first amplitude level and demodulation of said second frequency range of said color difference signal into said output circuit at a second amplitude level.

9. In a color television receiver, the combination of, a source of a chrominance signal including modulations representing an I signal having a prescribed phase relative to a reference phase and including modulating frequencies having a first prescribed amplitude level in a lower frequency range and having substantially one half said first prescribed amplitude level in a higher frequency range, a source of demodulating signals having said prescribed phase, a demodulator device coupled to said chrominance signal source and to said demodulating signal source and having at least an output circuit and a demodulation amplitude level control electrode, demodulation amplitude level control means coupled to said demodulation amplitude level control electrode for providing demodulation of said lower frequency range of said I signal into said output circuit at a second prescribed amplitude level, and for providing demodulation of said higher frequency range of said I signal into said output circuit at substantially said second amplitude level.

10. The combination of, a source of a chrominance signal including modulations representing a color difference signal having a prescribed phase and including modulating frequencies and a first frequency range at a first prescribed relative amplitude level and in a second frequency range at a second prescribed relative amplitude level, a demodulator device coupled to said chrominance signal source and to said demodulating signal source and having at least an output circuit and a demodulation amplitude level control electrode, impedance means coupled to said demodulation amplitude level control electrode for providing degeneration of said demodulator device to yield demodulation of said first frequency range of said color difference signal into said output circuit at a third amplitude level and demodulation of said second frequency range of said color difference signal into said output at a fourth amplitude level.

11. The combination of, a source of a chrominance signal including modulation representing a color difference signal having a prescribed phase and including modulating frequencies and a first frequency range at a first prescribed relative amplitude level and in a second frequency range at a second prescribed relative amplitude level, a demodulator device coupled to said chrominance signal source and to said demodulating signal source and having at least an output circuit and a demodulation amplitude level control electrode, impedance means coupled to said demodulation amplitude level control electrode for providing degeneration of said demodulator device to yield demodulation of both said first and second frequency range of said color difference signal into said output circuit at a third amplitude level.

12. In a color television receiver, a source of local oscillations; a source of a chrominance signal consisting of double sideband frequency components symmetrically arranged in a given range about the frequency of said source of oscillations and single sideband frequency components on one side of said given frequency range; a synchronous detector circuit including a vacuum tube having a cathode, a plurality of grids, and an anode; means to couple said source of oscillations and said source of a chrominance signal to different ones of said grids; a degenerative cathode resistor connected from said cathode to a point of reference potential; and reactive impedance means connected in shunt with said cathode resistor, said reactive impedance means presenting a relatively low impedance at the frequencies of said single sideband frequency components and presenting a relatively high impedance at the frequencies of said double sideband frequency components.

13. In a color television receiver, a source of local oscillations, a source of a chrominance signal consisting of double sideband frequency components symmetrically arranged in a given frequency range about the frequency of said source of oscillations and single sideband frequency components on one side of said given frequency range, and a synchronous detector circuit including an electron discharge device having input electrodes coupled to said source of oscillations and to said source of a chrominance signal, said synchronous detector circuit including means to provide less amplification of frequencies in said double sideband range than in said single sideband range.

References Cited in the file of this patent

UNITED STATES PATENTS

| | | |
|---|---|---|
| 2,635,140 | Dome | Apr. 14, 1953 |
| 2,644,030 | Moore | June 30, 1953 |
| 2,663,756 | Kalfaian | Dec. 22, 1953 |
| 2,666,806 | Kalfaian | Jan. 19, 1954 |
| 2,680,147 | Rhodes | June 1, 1954 |
| 2,718,546 | Schlesinger | Sept. 20, 1955 |
| 2,725,422 | Stark | Nov. 29, 1955 |

OTHER REFERENCES

Two-Color Direct-View Receiver for the RCA Color Television System, November 1949.

The Sylvania Technologist, July 1952.